(12) United States Patent
Welle et al.

(10) Patent No.: US 9,163,971 B2
(45) Date of Patent: Oct. 20, 2015

(54) EVALUATION DEVICE AND METHOD FOR DETERMINING A CHARACTERISTIC VARIABLE FOR THE LOCATION OF A BOUNDARY SURFACE IN A CONTAINER

(75) Inventors: Roland Welle, Oberwolfach (DE); Karl Griessbaum, Muehlenbach (DE); Josef Fehrenbach, Haslach (DE)

(73) Assignee: VEGA Grieshaber KG, Wolfach (DE)

( * ) Notice: Subject to any disclaimer, the term of this patent is extended or adjusted under 35 U.S.C. 154(b) by 468 days.

(21) Appl. No.: 13/467,646

(22) Filed: May 9, 2012

(65) Prior Publication Data

US 2013/0118251 A1    May 16, 2013

Related U.S. Application Data

(60) Provisional application No. 61/490,760, filed on May 27, 2011.

(30) Foreign Application Priority Data

May 27, 2011   (EP) ...................................... 11167924

(51) Int. Cl.
   G01F 22/00       (2006.01)
   G01F 23/284      (2006.01)

(52) U.S. Cl.
   CPC .............. G01F 22/00 (2013.01); G01F 23/284 (2013.01)

(58) Field of Classification Search
   CPC .............. G01F 23/284; G01F 23/2845; G01F 23/0061; G01F 23/2962; G01F 23/28; G01F 23/296; G01F 23/2961; G01F 22/00; G01S 15/08; G01S 13/08; G01S 15/42
   USPC ....... 73/290 B, 290 R; 342/124; 367/107, 99; 702/55
   See application file for complete search history.

(56) References Cited

U.S. PATENT DOCUMENTS

| | | | |
|---|---|---|---|
| 5,438,867 A | 8/1995 | Van Der Pol | |
| 7,284,425 B2 | 10/2007 | Wennerberg et al. | |
| 2003/0061876 A1* | 4/2003 | Atkinson | 73/290 V |
| 2004/0257269 A1* | 12/2004 | Laun | 342/124 |
| 2008/0060431 A1 | 3/2008 | Frovik | |
| 2009/0128396 A1* | 5/2009 | Fehrenbach et al. | 342/124 |
| 2009/0273506 A1* | 11/2009 | Delin | 342/124 |
| 2009/0299662 A1* | 12/2009 | Fehrenbach et al. | 702/55 |

(Continued)

FOREIGN PATENT DOCUMENTS

| | | |
|---|---|---|
| DE | 198 24 267 | 12/1999 |
| DE | 10 2004 052 110 | 5/2006 |

(Continued)

OTHER PUBLICATIONS

Devine, "*Radar Level Measurement, The User's Guide*",Vega Contols, 2000, 40 pages.

*Primary Examiner* — Hezron E Williams
*Assistant Examiner* — Marrit Eyassu
(74) *Attorney, Agent, or Firm* — Fay Kaplun & Marcin, LLP

(57) ABSTRACT

An evaluation apparatus and a method for determining a characteristic variable for the location of a boundary surface in a container are described, wherein a multiple echo having at least the order of one is recognized in an echo curve. The characteristic variable for the location of the boundary surface in the container is determined based on the position of the multiple echo and the order of the multiple echo.

15 Claims, 6 Drawing Sheets

(56) References Cited

U.S. PATENT DOCUMENTS

| | | |
|---|---|---|
| 2010/0156702 A1* | 6/2010 | Edvardsson ............... 342/124 |
| 2011/0231118 A1 | 9/2011 | Welle |
| 2012/0169528 A1* | 7/2012 | Edvardsson et al. ......... 342/124 |

FOREIGN PATENT DOCUMENTS

| | | |
|---|---|---|
| DE | 10 2004 061 449 | 6/2006 |
| DE | 10 2006 019 191 | 10/2007 |
| EP | 1 066 538 | 1/2001 |
| EP | 2 166 320 | 3/2010 |
| EP | 2 309 235 | 4/2011 |
| WO | 00/43806 | 7/2000 |
| WO | 03/016835 | 2/2003 |
| WO | 2006/063933 | 6/2006 |
| WO | 2007/122116 | 11/2007 |
| WO | 2009/037000 | 3/2009 |
| WO | 2010/071564 | 6/2010 |

* cited by examiner

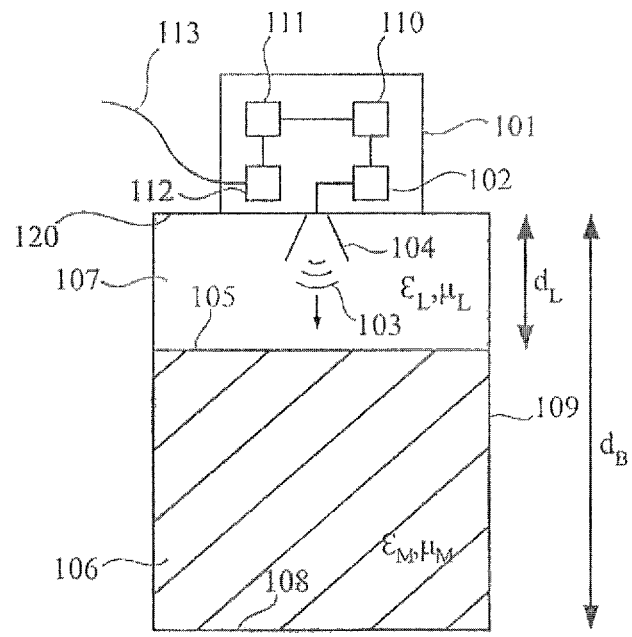
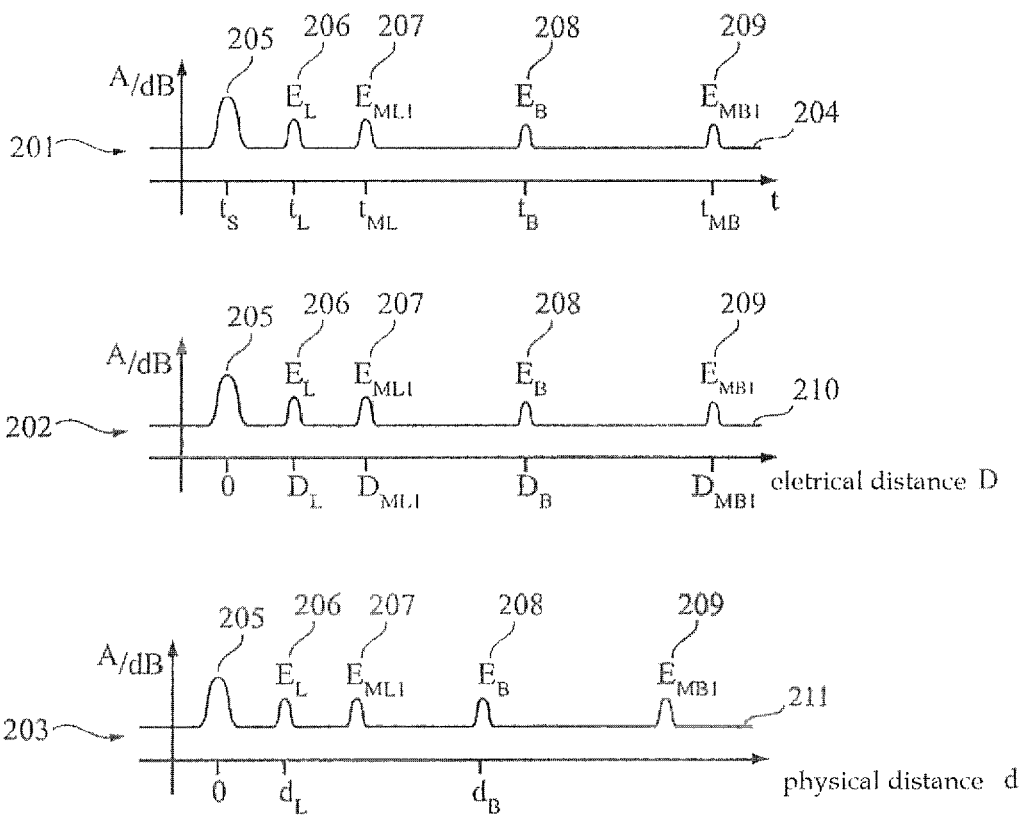
Fig. 1
Fig. 2

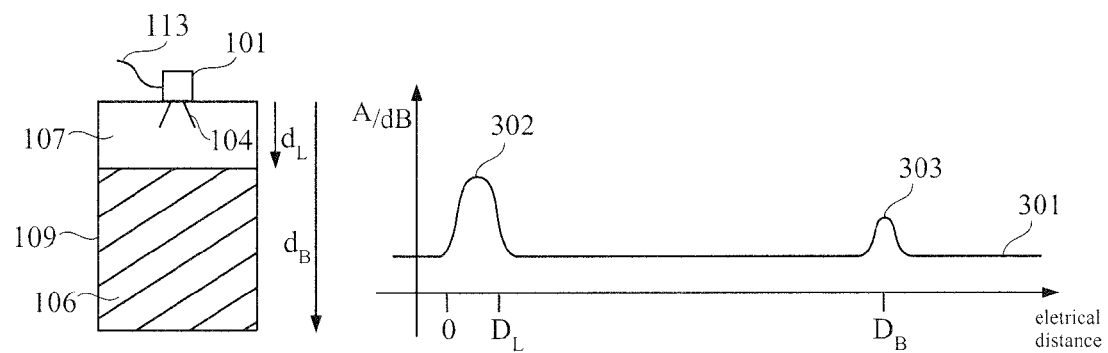
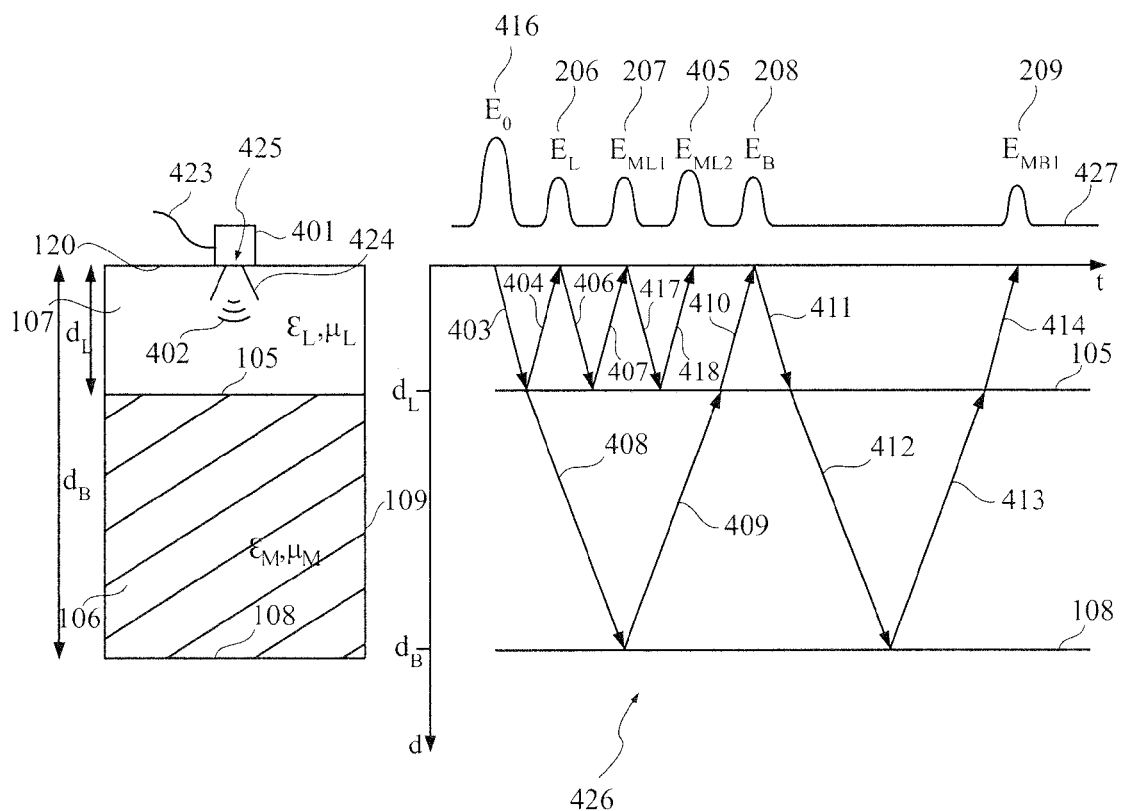
Fig. 3
Fig. 4

EVALUATION DEVICE AND METHOD FOR DETERMINING A CHARACTERISTIC VARIABLE FOR THE LOCATION OF A BOUNDARY SURFACE IN A CONTAINER

REFERENCE TO RELATED APPLICATIONS

This application claims the benefit of the filing date of EP Patent Application No. EP 11 167 924.7 filed 27 May 2011 and U.S. Provisional Patent Application Ser. No. 61/490,760 filed 27 May 2011, the disclosures of both applications are hereby incorporated by reference.

TECHNOLOGICAL FIELD

The present invention relates to the field of measurement technology; in particular, the present invention relates to the field of level measurement using transit time methods. An evaluation apparatus for a level meter for determining a characteristic variable for the location of a boundary surface, a method for determining a characteristic variable for the location of a boundary surface in a container, a computer-readable memory medium for carrying out the method according to the invention, and a program element for carrying out the method according to the invention are described.

BACKGROUND

A level meter has an evaluation electronics system and a level sensor. The signal processing takes place in the evaluation electronics system. In the level sensors which operate according to the frequency modulated continuous wave (FMCW) transit time method or pulse transit time methods, signals, for example electromagnetic or acoustic waves, are emitted in the direction of a filling material surface. A level sensor often has an antenna for targeted transmission of the signals. After the signal is transmitted, the sensor records the reflection of the emitted signal as echo signals. Echoes may be caused by the reflections from a filling material, structures in the container interior, and the container itself. Based on the detected echo signals, which are often available as echo curves, the sensor deduces the location or position of a surface or boundary surface of at least one of the filling materials present in the container.

When acoustic or optical waves are used, the signal generated by the level meter, in particular the sensor thereof, generally freely propagates in the direction of the filling material surface to be measured. In instruments which use radar waves for measuring the filling material surface, free propagation in the direction of the medium to be measured as well as propagation inside the interior of a hollow conductor which conducts radar waves from the level meter to the medium are taken into account. In instruments which operate according to the guided microwave principle, the high-frequency signals are conducted along a waveguide toward the medium.

A portion of the arriving signals, in particular a portion of the signal energy, is reflected on the surface of the medium or bulk material to be measured, or in general on the boundary surface to be measured, and after an appropriate transit time returns to the level meter, where it may be detected by the sensor of the level meter. The unreflected signal components, in particular the unreflected component of energy contained in the signal, penetrate(s) into the medium or filling material, and propagate(s) further in the medium in the direction of the container bottom, corresponding to the physical properties of the medium. The container bottom is generally situated opposite from the level meter. The signals which penetrate into the medium are reflected on the container bottom the same way as on a boundary surface, and after passing through the medium once again, and possibly through an overlying atmosphere, return to the level meter where they may be recorded by the sensor of the level meter. The level meter receives the signals reflected at the various locations, and based on these signals determines the distance between the level meter and the filling material, according to various methods.

The book by Peter Devine entitled *Radar Level Measurement: the User's Guide*, ISBN 0-9538920-0-X, describes the design principle of radar level sensors.

The publication DE 10 2004 052 110 A1 describes a method for measuring a filling level in which, based on at least one property of an echo, such as a change in the transit time, a characteristic variable is determined, on the basis of which the echo is classified.

The publication DE 10 2006 019191 describes a method for determining and monitoring a filling level in a container.

The publication WO 2010/071564 A1 describes reference impedances at known positions on a waveguide in order to reflect a portion of an electromagnetic signal.

The publication US 2008/0060431 describes the determination of a filling level via a bottom reflection if the distance from the bottom is known.

The publication DE 198 24 267 A1 describes a method for recognizing useful echoes and spurious echoes, in which a measure of speed is determined for individual echoes, and the measures of speed for various echoes are compared in order to use the result of the comparison in the echo evaluation.

The publication U.S. Pat. No. 5,438,867 describes a method for measuring a level of a liquid in a container, in which a spurious signal, in particular a signal reflected on the bottom, is filtered out or otherwise taken into account by the measuring technique.

The publication WO 03/016835 describes a method for evaluating measuring signals by comparing a measurement curve to reference signal data.

The publication WO 2009/037000 describes the tracking of echoes using a tracking method.

The publication EP 2 166 320 A2 describes the use of a reflection of a higher mode for estimating the position of a reflection of a main mode.

However, none of these documents describes efficient measurement of a location of an interface.

SUMMARY OF THE INVENTION

The present invention relates to an evaluation apparatus for a level meter for determining a characteristic variable for the location of a boundary surface in a container, a method for determining a characteristic variable for the location of a boundary surface in a container, a computer-readable memory medium on which a program for carrying out the method according to the invention is stored, and a program element for carrying out the method according to the invention are described.

According to one aspect of the present invention, an evaluation apparatus is provided for a level meter for determining a characteristic variable for the location of a boundary surface in a container. The evaluation apparatus has an echo curve evaluation device for receiving and evaluating an echo curve. The evaluation apparatus also has an output device for providing the characteristic variable for the location of the interface. In one example, the evaluation apparatus may have an input device for inputting environmental parameters. This input device may be designed as a parameter determination unit and automatically determine at least a portion of the parameters.

According to one aspect, the characteristic variable may be a measure for the echo position and/or for the location of the boundary surface. In particular, the characteristic variable may be the echo position, for example expressed as a physical distance or an electrical distance in each case from a reference surface.

The output device is connected to the echo curve evaluation device. In addition, the echo curve evaluation device is configured to recognize at least one multiple echo in the echo curve and to determine the position of the at least one multiple echo, as well as to determine the order of the multiple echo. The multiple echo which is to be recognized has at least the order of one. Thus, the multiple echo, which is used in the evaluation apparatus as the basis for determining the characteristic variable for the location of the boundary surface, may be at least one first-order multiple echo or a higher than first-order multiple echo. In other words, the echo curve evaluation device may possibly not take zero-order echoes into account.

The echo curve evaluation device is also configured to determine the characteristic variable for the location of the boundary surface in the container, based on the position of the multiple echo and the determined order of this multiple echo, and, if present, the provided environmental parameter or the provided environmental parameters. This determination of the characteristic variable from the ascertained and/or input parameters may be carried out by computation. The determined characteristic variables may be provided to the output device for further processing.

In another example of the present invention, the characteristic variable for the location of the boundary surface may be provided as an echo characteristic value, with the condition that the echo characteristic value is associated with a multiple echo. Thus, it may have been determined for the echo characteristic value that the echo characteristic value is associated with the multiple echo. Such an echo characteristic value of a multiple echo may be, for example, a distance from a reference position, a start and end of a multiple echo, the amplitude of a multiple echo, or also the approximate position of a multiple echo. The echo characteristic value may be used for measuring an echo by an existing measuring device, which is able to make an assumption for obtaining a filtered echo characteristic value according to the criterion multiple echo which is at least of the first order.

According to further aspect of the present invention, a method is provided for determining a characteristic variable for the location of a boundary surface in a container. This method comprises receiving an echo curve, recognizing a multiple echo in the echo curve, and determining the position of the multiple echo and determining the order of this multiple echo. In one example, the method may comprise inputting of environmental parameters. The determined multiple echo is at least of the first order, so that multiple echoes of lower order than first order, for example multiple echoes of zero order, are not taken into account, are filtered out, or are discarded.

The characteristic variable for the location of the boundary surface in the container, which characteristic variable may be subsequently provided, is determined based on the determined position of the multiple echo and the determined order of the multiple echo, as well as the environmental parameter or a plurality of input and/or learned environmental parameters.

According to another aspect of the present invention, a computer-readable memory medium is provided on which a program is stored which, when executed on a processor, carries out the method for determining a characteristic variable for the location of an interface in a container.

A computer-readable memory medium may be a memory chip, a CD, or a DVD, or also a computer network, from which the stored program may be retrieved.

According to yet another aspect of the present invention, a program element is provided which, when executed on a processor, carries out the method for determining a characteristic variable for the location of a boundary surface in a container.

A multiple echo may be a reflected signal which, before being received, has been reflected at least once on a ceiling surface. The ceiling surface may be located essentially opposite the boundary surface whose location is to be determined. In other words, the ceiling surface may be situated in the direction of propagation, relative to the boundary surface, of the signals reflected from the boundary surface. If the ceiling surface is a container cover, the sensor, i.e., the transmitter and/or the receiver of the signal, may be situated in the region of the ceiling surface. The ceiling surface may be situated opposite a bottom surface of the container.

A multiple echo may also be referred to as a manifold echo. The order of the multiple echo may correspond to the number of reflections on the ceiling surface. The order of a multiple echo may also correspond to the number of reflections of an emitted signal on a media surface or boundary surface of a filling material to be measured in a container, reduced by the value 1. In contrast to a mixed multiple echo, a multiple echo which is taken into account by the described method or the described apparatus may have been reflected multiple times on essentially the same boundary surface. For recognized multiple echoes, the echo curve evaluation device may therefore be configured to establish that the multiple echoes have been reflected from essentially the same interface.

A zero-order multiple echo may be referred to as a direct echo or main echo, while a multiple echo of higher than zero order may be referred to as an indirect echo. Since the described method and the described apparatus may take into account essentially only multiple echoes of higher order than zero, the described method and the described apparatus may be used to indirectly measure the position of a filling material surface or a boundary surface. However, the indirect measurement may also be combined with a direct measurement, for example when the results obtained from the two methods are to be compared.

A filling material (filling charge) may be the material which is filled into a container and which forms a reflection surface inside the container. The filling material may be a fluid, a gas, or a bulk material (bulk solid).

An echo curve, an echo diagram, or a reflection diagram may represent the variation over time of the received signals which have been produced by the emitted signals as the result of reflections on various reflectors. A time diagram is one form of representing and evaluating these reflections. Echoes, which may be gauged using various methods, may be visible as peaks or elevations in the time diagram. Determining relevant signals may involve ascertaining the plurality of peaks in the echo curve in such a way that a conclusion is possible as to which of the received echo signals corresponds to the filling level and is not caused by interferences.

The evaluation apparatus may have an input interface for receiving the echo curve, and the evaluation apparatus, in particular the output device thereof, may have an output interface for providing the determined characteristic variable for the location of the boundary surface.

These interfaces may be standard interfaces in measurement technology which operate, for example, according to the inter-integrated circuit ($I^2C$) standard, HART standard, field bus standard, Profibus standard, RS232 standard, or universal serial bus (USB) standard. The presence of standard interfaces of measurement technology also allows the evaluation apparatus to be configured to expand an existing measuring device, in particular an existing level meter, or field device, with the appropriate functionality for indirectly determining a characteristic variable for the location of the boundary surface in a container. The evaluation apparatus may thus also be provided as a retrofit kit for existing level meters.

According to a further aspect of the present invention, the echo curve evaluation device may be configured to determine a further multiple echo, and its position as well as its order, based on the echo curve.

In addition, the echo curve evaluation device may be configured to determine the characteristic variables for the location of the boundary surface in the container by linking the position of the further multiple echo and the order of the further multiple echo with the position of the multiple echo and the order of the multiple echo, and to provide same via the output device.

In determining the further multiple echo, in one example it may be ensured that both multiple echoes have been reflected from the same boundary surface.

Determining the sought characteristic variable by evaluating two different multiple reflections of a higher order than zero in conjunction with the found order may allow ascertainment of the characteristic variable using electrical distance values, thus avoiding the need for ascertaining physical distance values. Determining a fully compensated echo curve using physical distance values may thus be avoided.

According to another aspect of the present invention, at least one surface may be involved in the creation of the at least one multiple echo, the surface being selected from the group of surfaces composed of a boundary surface, a further boundary surface, a boundary surface between at least two different filling materials, and a bottom surface.

Since all boundary surfaces which are able to form inside a container may be used for the location determination, the computation may not be dependent on identifying echoes originating directly from the filling material surface. It may thus be essentially sufficient to ensure that the echoes used for the determination originate from the same surface. The order of the further multiple echo may be higher than the order of the multiple echo. The multiple echo and the further multiple echo may originate from the same emitted signal, and from reflections on the same boundary surface.

According to another aspect of the present invention, the echo curve evaluation device may take at least one environmental parameter into account in determining the characteristic variable for the location of the boundary surface. The at least one environmental parameter may be selected from the group of environmental parameters composed of [i] the relative permittivity of a filling material, [ii] the relative permeability of a filling material, [iii] the relative permittivity of an overlying atmosphere, [iv] the relative permeability of an overlying atmosphere, [v] the relative permittivity of a further filling material, [vi] the relative permeability of a further filling material, [vii] a dome shaft length, [viii] a negative dome shaft length, [ix] a container height and a distance of a sensor from a hall ceiling.

An input device may be provided at the evaluation apparatus for inputting the environmental parameter. Inputting the environmental parameter or multiple environmental parameters may provide the physical boundary conditions which describe the state in the container. In particular, the environmental parameter may describe the geometry of the container, the location of a sensor, and the material properties of the materials through which the emitted signal passes, as well as the geometry of the materials.

According to another aspect of the present invention, the evaluation apparatus may have a parameter determination device for determining at least one environmental parameter.

The parameter determination device may independently, in a self learning manner and automatically determine the at least one environmental parameter, for example the container height, the dome shaft length, or the negative dome shaft length, as well as the material properties such as the relative permeability or the relative permittivity of the filling material. The parameter determination device may, for example, be a sensor which is additionally connected to the level meter or to the evaluation apparatus. The input device may comprise the parameter determination device. The parameter determination device may allow the automatic determination of at least one environmental parameter. If such a parameter determination device is not present, the at least one environmental parameter may be manually input, for example using a keyboard, pushbuttons, a computer, or a handheld device.

According to yet another aspect of the present invention, the evaluation device may have a tracking device for tracking an echo over multiple measuring cycles. A measuring cycle may be the time interval over which an echo curve is ascertained. A sequence of individual echo curves along a time axis may thus be obtained.

The tracking device may record, store, and/or display multiple echo curves or echoes over multiple measuring cycles. Disappearance, emergence, and/or crossing of one echo through another may be determined by tracking an echo over multiple measuring cycles.

According to yet another aspect of the present invention, the output device may have at least one interface for providing a signal, the signal being configured to display a quality parameter such as an echo loss, the quality of a measurement, the significance of a measurement, and/or the type of the recognized multiple echo.

By means of this interface it is possible, for example, to inform a level meter of the quality of the determined characteristic value. The level meter may in turn display this quality on a display device, for example. The evaluation device may be used in situations in which no result is obtainable using other evaluation methods, such as the determination of direct echoes. Such a display device may be provided to notify a user of the presence of such a situation, and to inform the user that the level meter is using the proposed evaluation device specifically for determining the location of the boundary surface.

According to another aspect of the present invention, a level meter may be described which detects an echo curve according to the principle of transit time measurement. This level meter may have an evaluation apparatus for determining a characteristic variable for the location of an interface in a container according to the invention. The level meter may be configured to transmit the detected echo curve to the evaluation apparatus to obtain a characteristic variable for the location of an interface; the level meter may also be configured to determine a filling level based on the characteristic variable for the location of the interface which is obtained from the evaluation apparatus.

According to a further aspect of the present invention, the level meter has at least one additional evaluation apparatus for determining a further characteristic variable for the location of the boundary surface of the filling level, the additional evaluation apparatus operating in combination with the evaluation apparatus according to the invention, which determines and evaluates the multiple echoes that are present. The additional evaluation apparatus may use a method for determining the location of the boundary surface which method is different from the determining of multiple echoes.

This level meter having multiple evaluation devices may comprise a decision device. The evaluation apparatus and each of the least one additional evaluation apparatus may use a different principle to determine the particular characteristic value or characteristic variable for the location of the boundary surface. The decision device may be connected to the evaluation apparatus and to each of the at least one additional evaluation apparatus. The decision device may be configured to obtain from the evaluation apparatus the ascertained characteristic variables for the location of the boundary surface. Instead of multiple separate evaluation apparatuses, according to another aspect of the present invention the evaluation apparatus according to the invention may ascertain the characteristic variable according to different principles, and relay the ascertained results separately to the decision device. The evaluation apparatus may use the different principles in a predefinable sequence which, for example, is controlled by the decision device. However, in one example the decision apparatus or decision device may also determine the particular measuring principle that obtains essentially the best result, and use this result for determining the location of the boundary surface.

In one example, a level meter or limit level meter may be provided which essentially comprises only the evaluation apparatus according to the invention, and which thus uses the recognition of multiple echoes for determining the filling level or the limit level.

According to another aspect of the present invention, the individual evaluation apparatuses may relay to the level meter a quality parameter, a signal, or a display for the visibility of an echo, using the particular evaluation apparatus. By means of such a signal, the particular evaluation apparatus is able to communicate whether an echo has been recognized, i.e., whether an echo is visible, according to the principle which it uses. The quality of the result, i.e., the reliability of the ascertained result, determined by the particular evaluation apparatus may also be communicated.

The decision device may use the information communicated via such a signal to prioritize the determined characteristic variables from the evaluation apparatuses. Thus, the decision device is configured to select at least one of the evaluation apparatuses, and to determine the filling level based on the characteristic variable provided by the selected evaluation apparatus. However, the evaluation apparatuses may also be prioritized according to a predefined criterion, so that the characteristic variable provided by a given evaluation apparatus is preferred over a characteristic variable provided by another evaluation apparatus if the first-named parameter is available, i.e., if the echo determined by the method provided by the evaluation apparatus is visible. The prioritization may thus be set by the sequence of querying the evaluation apparatus. Alternatively, in addition to such linear processing, parallel processing is conceivable.

Depending on the quality of the data that are present, an additional or different evaluation apparatus may be used to allow delivery of a good measuring result from the level meter. Measurements according to various principles may also be carried out for verification and for conducting plausibility checking of measuring results.

The accuracy of a level measurement for almost completely full containers may be increased by evaluating a multiple reflection originating from the filling material surface. In addition, the accuracy of the level measurement may be increased when interfering reflections are present in the container. The accuracy of the level measurement for an almost empty container may be increased by indirectly measuring a multiple reflection which may originate from the container bottom. The decision device may be configured to recognize the particular situation that is present and to select the appropriate measuring method.

According to another aspect of the present invention, the decision device may be configured to indicate the quality for determining the filling level. For example, a display apparatus may be provided at the level meter, on which a digital value or an analog value, for example a light signal, informs a user of the level meter concerning the quality of the determined position of the filling level. For this purpose, the level meter may evaluate the quality parameters supplied to the evaluation apparatuses by the echo evaluation devices.

According to yet another aspect of the present invention, the method for level measurement detects the echo curve by carrying out a transit time measurement, and determines a characteristic variable for the location of a boundary surface in the container by evaluating the detected echo curve, using the method for determining a characteristic variable for the location of a boundary surface. In addition, the filling level is determined based on the characteristic variable for the location of a boundary surface. Signal values may be converted for determining the location of the boundary surface.

According to another aspect of the present invention, the method for level measurement may comprise providing at least one additional method for determining a characteristic variable for the location of a boundary surface in a container. The various methods may use different principles for determining the characteristic variable for the location of the boundary surface. The particular method which is appropriate may be selected, and the filling level may be determined based on the characteristic variable for the location of the boundary surface, using the selected method.

Different principles for the methods may represent the direct measurement of the boundary surface, the measurement of a further boundary surface, or the measurement of a bottom echo.

A further aspect of the present invention may be seen in, a level meter provided for determining the position of a filling level and/or of a separating layer in a container, the level meter having an echo curve detection device for detecting at least one echo curve, which depicts the reflection conditions along a distance from the level meter to the container and back. The echo curve detection device may have a sensor. The level meter may also have an evaluation apparatus for evaluating the at least one echo curve, the evaluation device identifying at least one echo in the echo curve, and this at least one echo being reflected, along a distance from the level meter to the container and back, at least twice at the same boundary surface of at least one filling material contained in the container. In addition, the level meter may have a measuring device for determining the position of a filling level and/or of a separating layer in a container, the position of a filling level and/or of a separating layer in the container being ascertained mathematically from the position of the at least one identified echo for determining the position.

According to yet another aspect of the present invention, the boundary surface of the at least one filling material contained in the container may be represented by the surface of the uppermost filling material with respect to the overlying atmosphere.

According to yet another aspect of the present invention, the boundary surface of the at least one filling material contained in the container may be represented by a separating layer between two different filling materials in the container.

According to yet another aspect of the present invention, the boundary surface of the at least one filling material contained in the container may be represented by the bottom of the container.

It is pointed out that different aspects of the invention have been described with reference to different subject matters. In particular, some aspects have been described with reference to device claims, while other aspects have been described with reference to method claims. However, one skilled in the art is able to infer from the preceding description and the following description that, unless stated otherwise, in addition to any combination of features which belong to a category of subject matters, also any combination of features which relates to different categories of subject matters is regarded as being disclosed by the present text. In particular, combinations of features of device claims and features of method claims are considered to be disclosed.

BRIEF DESCRIPTION OF THE FIGURES

Further exemplary embodiments of the present invention are described below with reference to the figures.

FIG. 1 shows an arrangement of a level meter on a container for better understanding of the present invention.

FIG. 2 shows three different scalings of an echo curve for the echo signal processing for better understanding of the present invention.

FIG. 3 shows an arrangement for level measurement, together with an echo curve, for indirectly determining a filling level for better understanding of the present invention.

FIG. 4 shows an arrangement for level measurement, together with an echo curve having a plurality of multiple echoes, according to one exemplary embodiment of the present invention.

DETAILED DESCRIPTION

Figure 5:
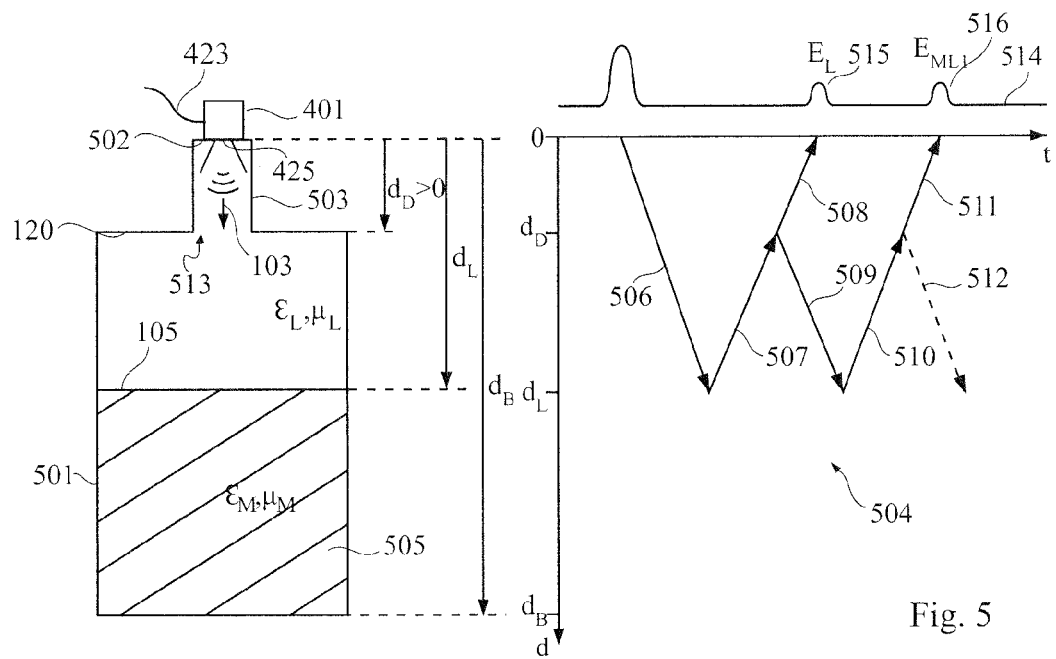
FIG. 5 shows an arrangement for level measurement, together with an echo curve, in a container having an installed dome shaft according to one exemplary embodiment of the present invention.

The illustrations in the figures are schematic and not to scale. The same reference numerals are used for identical or corresponding elements in the following description of FIG. 1 through FIG. 9.

The present invention may be used for determining the position of a filling material surface in the measurement of filling levels or distances of all types. The distance from the filling material determined using the evaluation apparatus, the method, or the level meter may be provided in analog form, for example via a 4 ... 20 mA interface, or also in digital form, for example via a field bus. For provision, an external interface may be used, via which the further external devices may have access, outside the evaluation apparatus, to the characteristic variable for the location of the separating layer or boundary layer. For example, the distance of the separating layer from a level meter or from a reference surface may be provided. In other words, the given characteristic variable may be relayed to another device for further processing.

For the level measurement in a container, on the path from the level meter toward the filling material surface of a filling material formed by a medium, the signal used for the measurement may move in the region of influence of a further medium, which may be referred to as an overlying medium. This overlying medium is located between the level meter and the surface of the medium to be measured, and is generally formed by a liquid or a gaseous atmosphere.

Frequently, air is present above the medium to be measured, while the medium itself may be a fluid or bulk material. Since the propagation of electromagnetic waves in air differs only negligibly from that in a vacuum, there is essentially no need for special corrections of the signals which are reflected through the air and back to the level meter from the filling material, i.e., the medium to be measured, the structures in the container interior, and the container itself.

In process containers in the chemical industry, various chemical gases and gas mixtures, for example, may occur as overlying medium. Depending on the physical properties of these gases or gas mixtures, the propagation properties of electromagnetic waves are changed compared to propagation in a vacuum or in air.

For the sake of simplicity, the following discussion concentrates essentially on the frequently occurring application of a single medium or filling material to be measured in a container. Without limiting generality, the considerations stated for this case may be applied to the application using two or more different media or filling materials in a container. With regard to a separating layer measurement, the position of a filling material surface may in particular also be the position of a separating layer between two different, layered media or filling materials in a container, which is essentially identical to the position of the filling material surface at the bottom, or of the two filling materials or media, the one closer to the bottom.

Various methods have been developed for level measurement, according to which the position of a filling material surface in a container may be determined.

FIG. 1 shows an arrangement for level measurement for better understanding of the present invention. The container 109 is filled with a liquid 106 to a filling height $d_B$-$D_L$. The distance of the liquid 106 from the container ceiling 120 is designated by $d_L$, and the distance from the container ceiling 120 to the container bottom 108 is designated by $d_B$. The container ceiling represents a general reference surface from which the signals are emitted and at which the reflected signal are received. The reference surface may be a surface on which the level sensor is present. The reference surface may thus be situated in a region of a measuring arrangement, starting at which a reflected signal is present in electronic form, and starting at which the signal processing begins. The space 107 above the liquid 106, i.e., the space between the container ceiling 120 and the liquid surface 105, is filled with air, for example. In the present example of FIG. 1, the liquid 106 is covered with air as overlying medium.

With the aid of a high-frequency unit 102 the level meter 101 generates an electromagnetic pulse 103, and couples the electromagnetic pulse into a suitable antenna 104, whereupon this pulse propagates approximately at the speed of light in the direction of the filling material surface 105 to be measured. The essentially exact speed within the overlying medium results from:

$$c_L = \frac{c_0}{\sqrt{\varepsilon_L \cdot \mu_L}} \quad (1)$$

where $c_0$ is the speed of light in a vacuum, $\varepsilon_L$ is the relative permittivity of the overlying medium, and $\mu_L$ is the relative permeability of the overlying medium. The exact or actual speed thus takes into account the change in the speed of light in a vacuum in the overlying medium 107.

The filling material surface 105 reflects at least a portion of the arriving signal energy, whereupon the reflected signal component propagates back to the level meter 101. The unreflected signal component penetrates into the liquid 106, and propagates therein at a greatly reduced speed in the direction of the container bottom 108. The speed $c_M$ of the electromagnetic wave 103 within the liquid 106 is specified by the material properties of the liquid 106:

$$c_M = \frac{c_0}{\sqrt{\varepsilon_M \cdot \mu_M}} \quad (2)$$

where $c_0$ is the speed of light in a vacuum, $\varepsilon_M$ is the relative permittivity of the liquid, and $\mu_M$ is the relative permeability of the liquid. The remaining signal component is likewise reflected on the bottom 108 of the container 109, and after an appropriate transit time returns to the level meter 101. The arriving signals are received in the level meter with the aid of a sensor, prepared using the high-frequency unit 102, and preferably transformed into a lower-frequency intermediate frequency range (IF). In one embodiment, the signals may be plotted as an analog curve or analog echo curve over a certain time interval. This time interval determines a measuring cycle. With the aid of an analog-digital converter unit 110, the analog echo curves provided by the high-frequency unit 102 are digitized and provided to an evaluation apparatus 111.

The above-mentioned components which are used for providing a digitized echo curve, i.e., in particular the high-frequency unit 102 and the analog-digital converter unit 110, may, for example, define an echo curve detection device 102, 110 of a level meter 101.

In determining echo characteristic values, for example the location of an echo, a distinction may be made between a rough determination and a fine determination. In the rough determination, essentially only an approximate location of an echo may possibly be of interest. The roughly determined values may be used for rapid plausibility checks. A rough determination may be carried out at reduced computing power. As soon as an essentially precise or exact location is of interest, a fine determination may be carried out, and an essentially exact location may be determined. The accuracy of a roughly determined echo position may be less than the accuracy of a precisely determined echo position. On the other hand, the determination speed for an exact echo position may be lower than the determination speed for a rough echo position.

The evaluation apparatus 111 analyzes the digitized echo curve, and on the basis of the echo contained therein, according to various echo evaluation methods determines the echo that has been directly generated by the reflection on the filling material surface 105. In addition, the evaluation apparatus 111, which in the present example may also be used as a measuring device 111 or gauging device 111, determines the exact electrical distance from this echo within the limits of measuring accuracy. Furthermore, the determined electrical distance from the echo is corrected in such a way that influences of the overlying medium 107 on the propagation of the electromagnetic waves are compensated for, thus allowing physical distance values to be provided. The compensated distance from the filling material which is computed in this manner is handed over to an output device 112, which further processes the determined value according to the specifications of the user, for example by linearization, offset correction, or conversion into a filling height $d_B$-$D_L$. The processed measured value is provided to the outside to an external communication interface 113. Any established interface may be used, in particular 4 ... 20 mA current interfaces, industrial field buses such as HART, Profibus, Fieldbus Foundation (FF), I²C, or also computer interfaces such as RS232, RS485, USB, Ethernet, and FireWire.

FIG. 2 illustrates in detail three steps which within the scope of the echo signal processing are used in the evaluation device 111 for compensating for the influences of various media.

These steps correspond to three curve progressions of echo curves. Curve 201 shows the digitized echo curve 204 detected by the analog-digital converter unit 110 over time t. In particular, the curve progression shows an echo curve over one measuring cycle. Curve 201 shows the recorded signal amplitudes in dB above a time scale t. Echo curve 201 initially contains the component of the transmitter pulse 205, also referred to as antenna ringing 205, reflected within the antenna. A short time later at point in time $t_L$, a first echo 206 is detected which is caused by the reflection of signal components on the boundary surface 105, the separating surface 105, or the surface 105 of the medium 106 in the container. An additional echo 207 results as first multiple echo $E_{ML1}$ of the filling material echo 206, and is detected at point in time $t_{ML}$. The signal components penetrating into the medium 106 are reflected on the container bottom 108 after passing through the filling material 106, and generate a further echo 208 within the echo curve 204. This bottom echo 208 is detected at point in time $t_B$. In addition, a multiple echo 209 of the bottom echo may be detected at point in time $t_{MB}$.

The time-dependent curve 201 is transformed into a distance-dependent curve 202 in a first processing step. During this transformation it is assumed that the detected curve has formed essentially due to propagation in a vacuum. The ordinate of the illustration 201 is converted into a distance axis, for example having units of m, by multiplying by the speed of light in a vacuum. In addition, by establishing an offset, the echo 205 caused by the antenna 104 acquires the distance value 0 m. Furthermore, the distance values are multiplied by a factor of 0.5 to eliminate the double path toward the filling material surface 105 and back.

The second illustration 202 shows the echo curve 210 as a function of the electrical distance D. The electrical distance corresponds to one-half the distance traveled by an electromagnetic wave in a vacuum in a given time period. The electrical distance essentially takes no influences of a medium into account which may possibly result in slower propagation of the electromagnetic waves. Curve 202 therefore represents an echo curve which is uncompensated for but which is referenced to locations.

In the present text, electrical distances are denoted by capital letter D, while physical distances, which may be measured directly at the container for verification purposes are denoted by small letter d.

In addition, it may be possible to fully compensate for the echo curve 210 in order to take into account the different propagation speed in various media. The third illustration 203 shows a fully compensated echo curve 211. To obtain an illustration of the echoes above the physical distance, in the present case the influence of the overlying medium 107 in the region between locations 0 and $D_L$ of the curve 202 is taken into account. Location 0 may relate to the reference surface 120, or to a zero point of the measurement that is specified and input by the customer. This zero point may be provided as an environmental parameter, for example. The electrical distance information $D_i$ on the abscissa which is between 0 and $D_L$ is converted into physical distance information $d_i$ according to the following relationship:

$$d_i = \frac{D_i}{\sqrt{\varepsilon_L \cdot \mu_L}} \quad (3)$$

Since $\varepsilon_L$ and $\mu_L$ for air correspond to the value 1 in a good approximation, in the present example essentially no correction is necessary for this segment from 0 to $D_L$. However, the electrical distance information on the abscissa equal to or greater than $D_L$ (electrical distance of the filling material surface 105) is converted into physical distance information according to the following relationship:

$$d_i = d_L + \frac{(D_i - D_L)}{\sqrt{\varepsilon_M \cdot \mu_M}} \quad (4)$$

Lastly, the third illustration 203 of the echo curve shows the corrected curve or fully compensated curve. The distance $d_L$ from the echo 206 from the filling material surface 105 as well as the distance $d_B$ from the echo 208 generated by the container bottom 108 match the distances which may be measured at the container 109 for verification purposes. The distance from the multiple echo 207 of the filling material surface, in particular from the multiple echoes of a higher order than zero, cannot be directly measured at the container for verification purposes, since the above compensation is valid only for direct reflections. The same applies for the multiple echo 209 of the reflection on the container bottom 108.

At this point it is noted that within the scope of the signal processing the conversion into curve 202, i.e., the determination of the electrical distances or the position of various echoes, may be carried out in the device essentially for all echoes. The conversion of the echo curve 210, which is scaled to the electrical distance, into a compensated echo curve 211 is generally not performed; the correction of a single distance value or the position of an echo is sufficient. In other words, computing power may be saved when not all values of an echo curve, but instead only the position values that are actually of interest, are fully compensated for.

For the application from FIG. 1, on account of values known in advance for the relative permittivity and the relative permeability for air, in practice no significant problems result with respect to the distance $d_L$ between the sensor of the level meter 101 and the filling material surface 105. In the present text, it is basically assumed that the properties of the media present in the container, in particular the relative permeabilities and the relative permittivities, are known within the device 101, for example after inputting by the user, for example using an input device for environmental parameters (not shown in FIG. 1).

In addition to manually inputting the environmental parameters, these parameters may be automatically determined using various methods or sensors; thus, for example, the height $d_B$ of the container 109 may be automatically determined. These methods for automatically determining the parameters may be used in combination with the method for determining the characteristic variable for the location of the separating layer.

In addition, the location $d_L$ of the echo caused by the surface 105 of the filling material 106 may be ascertained by determining the position of the echo 208 caused by the container bottom 108.

Even when the direct echo $E_L$ 206 of the filling material surface 105 is not present, the physical distance $d_L$ from the surface 105 of the medium 106 to be measured may be indirectly determined based on the electrical distance $D_B$ of the bottom echo $E_B$ 208, as follows:

$$d_L = \frac{d_B \cdot \sqrt{\varepsilon_M \cdot \mu_M} - D_B}{\sqrt{\varepsilon_M \cdot \mu_M} - \sqrt{\varepsilon_L \cdot \mu_L}} \quad (5)$$

The above expression may be used in special cases, for example when the main echo $E_L$ 206 is overlapped by another reflection.

FIG. 3 illustrates the use of an indirect determination of the location of the filling material surface 105 based on a bottom echo $E_B$. The container 109 illustrated in FIG. 3 is almost completely filled with the filling material 106; i.e., $d_L$ is very small. Besides the echo 302 generated by the antenna 104, the echo curve 301 detected by the level meter 101 includes only the bottom echo 303 generated by the container bottom. The echo generated by the surface of the medium 106 cannot be reliably detected based on the detected echo curve 301 due to the fact that in the region of influence of the antenna echo 302 it is completely overlapped by the antenna echo. In other words, the direct echo is not visible. The distance $d_L$ from the filling material surface cannot be satisfactorily determined with the aid of a direct echo measurement. However, using the above described fact from formula (5), using the electrical distance $D_B$ which is ascertainable from the echo curve 301 the location of the filling level may be determined essentially exactly in an indirect manner based on the location of a bottom echo 303.

However, the above-described method reaches its limits in a number of practical applications. Due to the high degree of damping within the medium 106, the amplitude of the signal, and thus the recorded echo, may become progressively smaller with increasing filling height of the medium 106 in the container 109. As a result, it may be very difficult to identify the bottom echo 303 based on the echo curve 301, until a point is reached that the bottom echo is no longer visible. Due to the weak signal, the level meter may no longer be able to determine the distance from the surface of the filling material by means of bottom echoes.

One aspect of the present invention may be to provide a robust method for determining the location of a filling material surface. A core aspect of the present invention may be to evaluate the multiple echoes contained in a detected echo curve. In other words, an indirect measurement of multiple echoes may be used to determine a position of a filling material surface or separating layer. Thus, a method may be provided which is able to determine the location of a boundary layer when other methods no longer supply meaningful results.

FIG. 4 illustrates the relationships which may result in the formation of multiple echoes.

The level meter 401 according to the invention is situated with its sensor 425 on the reference surface 120. The sensor 425 uses the antenna 424 of the level meter 401 for the directional propagation of the signal 402 generated by the sensor, and assists the sensor 425 in receiving reflected signals. The level meter 401, in particular the sensor 425, generates an electromagnetic pulse 402 and emits it in the direction of the filling material surface 105 to be measured. The signal arrow 403 in the time-location diagram 426 illustrates the propagation of the signal as a function of the physical distance d over time t. The time-echo curve indicates the uncompensated echo curve over time, which may be depicted on a compensated echo curve over the physical distance d.

A portion of the transmitted signal 402 is reflected on the surface 105 of the filling material 106 which forms a boundary surface 105 or separating surface 105 of the filling material 106 with respect to the overlying atmosphere 107, and after an appropriate transit time returns to the level meter 401. The signal path 404 illustrates this propagation path. Based on the received signals, the level meter 401 forms an echo curve 427 which has a first echo $E_L$ 206, a direct echo $E_L$ 206, a zero-order multiple echo $E_L$ 206, or a main echo $E_L$ 206 as a result of the signal paths 403 and 404. A portion of the signals is once again reflected on the container ceiling 120 or on the level meter 401, for example, and propagates again in the direction of the filling material surface 105 as indicated by the signal arrow 406. This signal component is once again reflected from the filling material surface, and after an appropriate transit time returns to the level meter 401, where it is detected as the first multiple echo $E_{ML1}$ 207 of the filling material reflection $E_L$ 206 and is depicted on the echo curve 427 as an amplitude increase 207 or peak 207. The signal path 407 illustrates the creation process for the first multiple echo $E_{ML1}$.

A portion 408 of the irradiated signal energy 402 which is not reflected on the filling material surface 105 penetrates into the medium 106 and further propagates therein at decreased speed in the direction of the container bottom 108, which likewise defines a boundary surface of the medium or filling material. The signal 408 is reflected on the container bottom 108, and after an appropriate transit time returns to the level meter 401. The signal paths 403, 408, 409, and 410 illustrate the propagation of the signal on this path of the bottom echo $E_B$. It should be noted that the signal propagates at different speeds in the various media 107, 106, as is apparent from the different slopes of the signal paths 409, 410 in the signal path diagram. The level meter 401 receives the signal components reflected from the container bottom 108, and depicts these in the echo curve 427 in the form of a bottom echo $E_B$ 208.

Similar to the formation of multiple echoes 207 of the filling level echo 206, under favorable conditions it also possible to observe the formation of one or more multiple echoes $E_{MB1}$, $E_{MB2}$ ($E_{MB2}$ is not illustrated in FIG. 4) of the bottom echo $E_B$. The signal paths 411, 412, 413, 414 illustrate the occurrence of a first multiple echo $E_{MB1}$ 209 of the bottom echo $E_B$ 208, which after an appropriate transit time is likewise depicted in the echo curve 427 received by the level meter 401.

In the context of the present invention, the boundary surface 105 of a medium or filling material may be the surface of a filling material. The boundary surface of a filling material may also be the separating layer or the separating surface at the transition to another filling material in the container having different material properties. Furthermore, the boundary surface of a filling material may be the transition from the filling material to the container bottom 108.

In principle, it is possible to design higher-order multiple echoes. In this regard, the signal path diagram 426 shows by way of indication the signal paths 417 and 418, which are suitable for generating a second-order multiple echo $E_{ML2}$ based on the reflection on the filling material surface 105. Corresponding higher-order multiple echoes are also possible for the reflection on the container bottom. Without limiting generality, the following description essentially addresses first-order multiple echoes. Using the above-described principles, the considerations discussed based on first-order multiple echoes may be applied to higher-order multiple echoes.

The order of a multiple echo is defined as the number of reflections of an emitted signal on a media surface of a filling material to be measured in the container, reduced by the value 1. According to this nomenclature, the echo $E_L$ 206 is identical to a zero-order multiple echo, while the echo $E_{ML1}$ 207 is identical to a first-order multiple echo, and the echo $E_{ML2}$ 405 is identical to a second-order multiple echo.

In addition, mixed signal paths are conceivable which result in further echoes within the received echo curves. It may thus be possible, for example, for the signal to penetrate into the medium after traversing the signal path 406 and to propagate in the direction of the container bottom. Furthermore, it may also be possible, for example, for a portion of the signal energy to be reflected from the filling material surface after traversing the signal path 411, and to once again propagate directly in the direction of the level meter. Within the scope of the present invention, mixed signal paths are further considered only to the extent that they may be detected. Since the steps of the present invention, illustrated based on first-order multiple echoes, may be applied to mixed multiple echoes, mixed multiple echoes are not discussed in greater detail herein. In the present context, mixed multiple echoes are defined as echoes of an echo curve which are caused by signal paths having at least two reflections on at least two different boundary surfaces of a filling material. In other words, the signal path of a signal generated by a level meter may be reflected on at least two different boundary surfaces of a filling material in a container. The mixed multiple echoes are not illustrated in FIG. 4 for the sake of clarity.

Although the arrangement according to FIG. 4 is based on mounting the level meter 401, in particular the sensor 425, essentially on the container ceiling 120, the level meter 401 and in particular the evaluation device may also be used in or on containers having an installed dome shaft.

FIG. 5 shows one exemplary embodiment for use of the measuring device 401 according to the invention in such a container 501 having an installed dome shaft 503. The level meter 401 is not directly mounted at the height of the container ceiling 120, but, rather, is located in a dome shaft 503, on the dome shaft cover 502. The dome shaft has a physical length of $d_D$>0. The installed position of the level meter in or on the dome shaft 503 may influence the formation of multiple echoes. The sensor 425 is installed at the height of the dome shaft cover 502, and thus specifies the reference plane 502 for the distance measurement. This displacement of the reference plane may be taken into account in an offset. In particular, the reflection plane 120 essentially no longer coincides with the measurement plane 502 or reference plane 502. The dome shaft may be rectangular or cylindrical. The signal path diagram 504 illustrates the formation of multiple echoes in the present case. The signal 103 generated by the level meter 401 initially propagates through the dome shaft 503 and the actual container, and toward the surface 105 of the medium 505. The signal path 506 illustrates this propagation path. The medium reflects the signal, whereupon the signal propagates in the direction of the level meter 401. Since the opening 513 in the dome shaft 503 is small in relation to the container ceiling 120, only a very small portion of the signal is depicted as a filling level echo $E_L$ 515 on the echo curve 514. The signal paths 507 and 508 illustrate this process. The much greater portion of the signal energy is reflected on the container ceiling 120 and returns, optionally in damped form, to the filling material surface 105 via the signal path 509. In this manner, a first multiple echo $E_{ML1}$ 516 is depicted on the echo curve 514 after passage over the signal paths 509, 510, and 511. The presented relationships for dome shafts also correspondingly apply to the higher-order multiple echoes, as indicated by the signal path 512, as well as for the multiple echoes of the bottom reflection. A dome shaft may also be named manhole pit.

Figure 6:
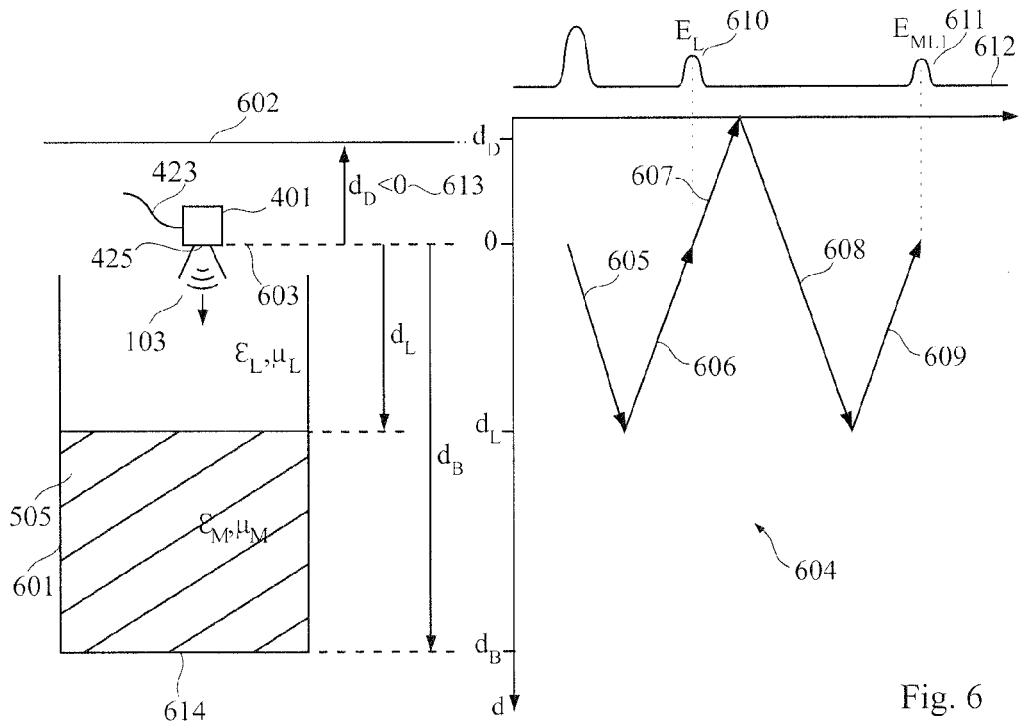
FIG. 6 shows an arrangement for level measurement, together with an echo curve, in an open container according to one exemplary embodiment of the present invention.

In industrial applications, configurations are also present which allow the determination of multiple echoes as the result of introducing a negative dome shaft length. FIG. 6 shows an associated application. The level meter 401 according to the invention is mounted above a container 601 that is open on top, the entire measuring system being located in a hall, for example, so that a reflection surface 602, for example in the form of a flat metal roof 602, may be located above the system. In other words, the level meter 401 together with the sensor 425 is mounted in a signal transmission direction on a side of a container 601 opposite the surface of a filling material 505, outside the container geometry. The container 601 has an open, i.e., coverless, design in the direction facing the level meter 401. This open design of the container 601 allows the level meter 401 to emit the signal 103 toward the surface of the filling material 505 even when the level meter is mounted outside the container 601. For this purpose, the level meter is situated in such a way that an emitted signal 103 moves essentially perpendicularly to the surface of the filling material 505 and in the direction to the filling material 505. The installation site of the level meter 401 in the vertical direction, i.e., in a plane along the signal propagation, specifies a reference plane 603 at the height of the sensor 425. The reference plane extends essentially perpendicularly to a signal propagation direction. The reference plane may be situated essentially on the bottom of a level meter, i.e., on the side of a sensor of the level meter. The installation site of the sensor specifies the location of the reference plane 603. The level meter, and thus also the sensor 425, is situated between the filling material 505 and the reflection plane 602. In the course of the signal processing in the level meter 401, the distance $d_D$ of the reference plane 603 of the level meter 401 from the hall roof 602 is taken into account as a negative dome shaft length 613 having a physical length of $d_D<0$. In the context of the present invention, the system comprising the level meter, the container, and the hall roof may therefore have a dome shaft, which may have a negative length. In other words, for an arrangement of a level meter 401 between an open container and a reflection plane 602, the distance of the reflection plane 602 from the reference plane may be regarded as a negative dome shaft length $d_D$.

When measurements are then made by the level meter 401, signal paths result according to the illustration of the signal path diagram 604. The direct reflection on the filling material surface, which is illustrated by the signal paths 605 and 606, is depicted as a filling level echo $E_L$ 610 in the echo curve. The signal 606 reaches the level meter 401 before it further propagates as signal 607 to the reflection surface 602. The vast majority of the signal energy propagates to the hall roof 602, is reflected from same, and after reflecting again on the filling material surface results in the first multiple echo $E_{ML1}$ 611 within the echo curve 612. The signal propagation which results in this echo is indicated by the signal paths 607, 608, and 609.

Figure 7:
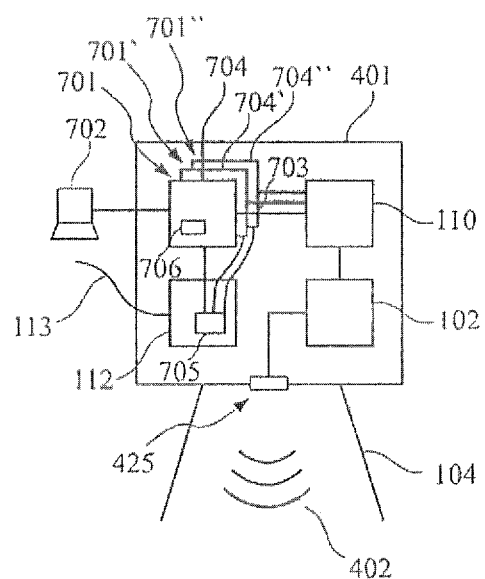
FIG. 7 shows a block diagram of a level meter according to one exemplary embodiment of the present invention.

The internal design of a level meter 401 according to the invention is illustrated in greater detail in FIG. 7. The sensor 425 for transmitting and receiving the signal 402 is connected to the high-frequency unit 102, which in turn is connected to the analog-digital converter unit (A/D converter) 110. A signal which is digitized by the A/D converter, in particular an echo curve, is provided to the echo curve evaluation device 704 of an evaluation apparatus 701 via a receiving device 703, for example via a field device interface 703 or via a measuring device interface 703. The level meter may have a plurality of evaluation apparatuses having further echo evaluation devices 704', 704" which operate according to different principles. The echo curve evaluation device 704 receives environmental parameters via the input device 702 and/or a self-learning device, for example. Via the output device 112, the echo curve evaluation device 704 provides the parameter which it has determined for the location of the boundary surface. The output device 112 may have an external interface 113 for providing the characteristic variable for the location of the boundary surface to a further processing apparatus (not shown in FIG. 7). A quality parameter which provides the quality of the measuring result may be relayed via the output device 112 as well as via the external interface 113. A decision device 705 may be supplied with this parameter which determines the characteristic variable for the filling level based on a plurality of different echo evaluation devices 704, 704', 704". The decision device 705 may be part of the output device 112, and may be used as a preprocessing device before the characteristic variable is provided via the external interface 113. The evaluation apparatus 701 may have a memory device (not shown in FIG. 7) and a tracking device 706 for storing echo curves, in particular for echo tracking. A characteristic variable may also referred to as characteristic value.

Figure 8:
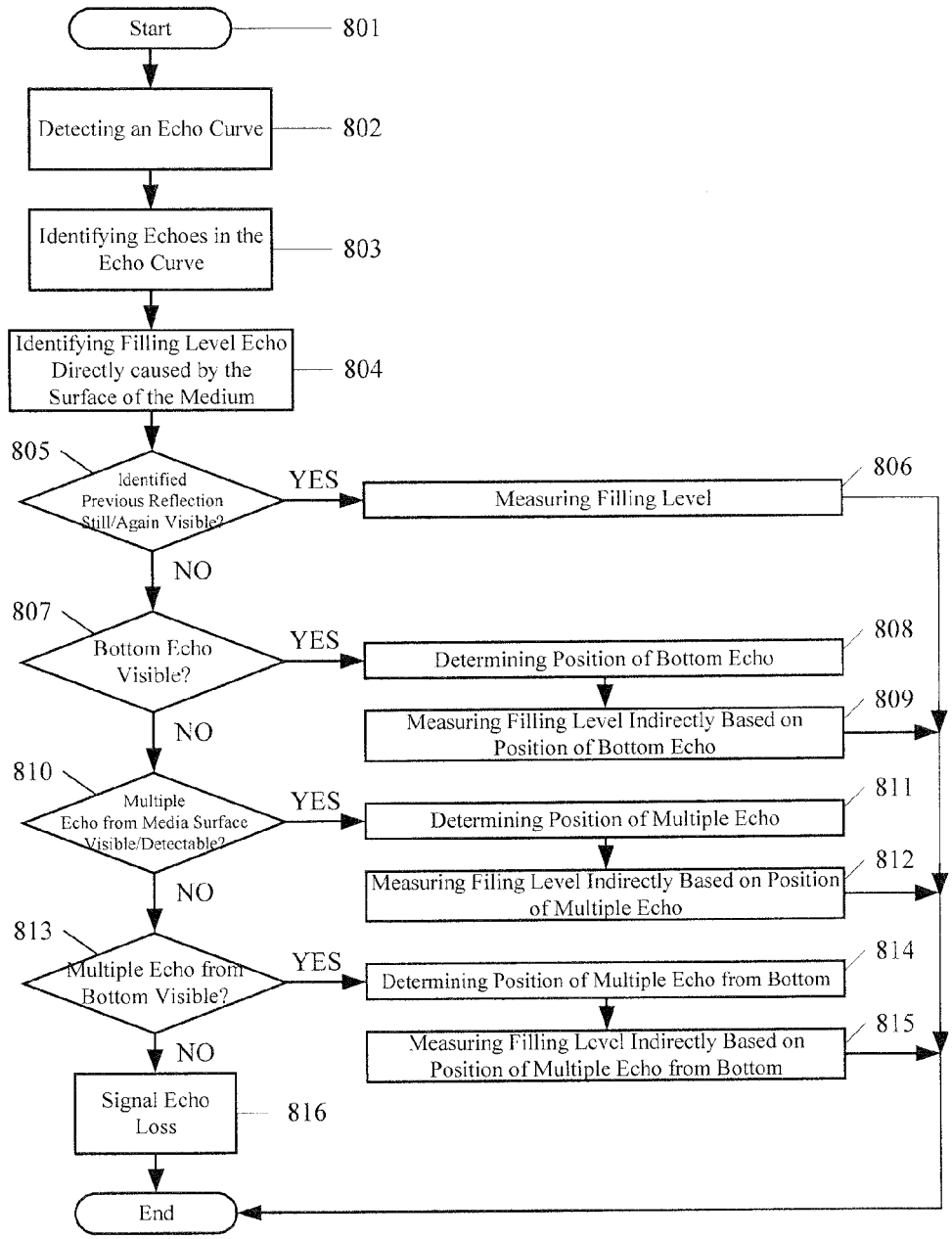
FIG. 8 shows a flow chart for a method for level measurement according to one exemplary embodiment of the present invention.

FIG. 8 shows a flow chart according to which the level meter 401 may ascertain the location of a filling material surface in the container.

The level meter 401 begins a cycle in step 801. With the aid of the high-frequency unit 102 and the analog-digital converter 110, in step 802 an echo curve is detected and transmitted in digital form to an additional evaluation apparatus 701', 701" which operates according to the principle of direct echo evaluation, for example.

Using the further echo evaluation device 704', in a subsequent step 803 the additional evaluation apparatus identifies the echoes 206, 207, 208, 209 contained in the echo curve 204. In the identification of the echoes, it is possible that a distinction is not yet made with regard to the type of echo. First echo characteristic values are determined in the echo identification, for example the start and end of each echo, the amplitude of the echo, or the approximate position of the particular echo. In addition, further or also changed characteristic values of the identified echoes may be determined. The characteristic values determined in the echo identification are used in defining the echoes. In an alternative example, the echo identification may be carried out in the receiving unit 703.

In step 804 the additional evaluation device 701', 701" of the level meter 401 identifies the filling level echo 206 directly caused by the surface 105 of the medium 106. In other words, the boundary layer echo, in particular the filling level echo, is defined in step 804. Thus, the echo which is directly caused by the sought boundary layer is identified. For defining or identifying the boundary layer echo or the filling level echo, various methods may be used for identifying the filling level echo. If more than a single boundary layer echo is to be determined, the appropriate number of direct boundary layer echoes may be determined which corresponds to the number of boundary layers that are to be determined. For example, a filling level echo and an echo of a boundary layer between different materials may be determined. Since the boundary layer echoes are often caused by moving boundary layers, methods from the technical field of echo tracking, so-called tracking methods, may be used for defining the boundary layer. By using tracking methods it is possible to track an echo, which originates from a given reflection point within a container, over multiple measurements. It is also possible to detect the disappearance of an echo, whether due to excessive damping of the measuring signal or due to overlapping with another echo of the container. The most recent actual measured echo of the particular reflection point that has been stored within the evaluation apparatus 701 may thus be processed as a filling level echo. However, as an invisible echo it is provided with a suitable marker.

A check is then made in method step 805 as to whether the reflection identified in a prior recording or the actual measured reflection point of the filling material surface 105 is still, or once again, visible within the echo curve 204. If the echo is recognized as a visible echo, its exact position is ascertained and output by measuring the echo curve 204 or gauging echo curve 204, using a method for determining the direct echo. In other words, this may mean that in method step 805 a check is made as to whether an echo which has already been identified and defined as a filling level echo can still be identified and defined as a filling level echo in a newly provided echo curve. The filling level echo or boundary surface echo may be the direct echo from the observed boundary surface, i.e., the zero-order multiple echo. If this definition is possible using the tracking method, for example, this may be a visible echo, and a method for direct echo determination may be used. The direct echo already determined or the filling level echo is thus measured or gauged. If the visibility of the filling level echo is affirmed in step 805, the filling level echo is measured in step 806.

An evaluation using multiple echoes may then be dispensed with, or used only for checking the results of the direct echo measurement. The evaluation device 701 having the echo evaluation device 704, which operates according to the principle of multiple echo measurement, does not have to be activated. Therefore, the method may be terminated in step 817.

On the other hand, if the echo 206 from the filling material surface 105 or the direct echo is not visible, for example because it is overlapped by another echo, the echo cannot be measured or gauged based on the current echo curve. That is, direct measurement of the filling level echo is not possible. Measuring an echo may mean determining a distance between an echo peak and a reference point.

In the case of a negative answer concerning the visibility of the filling level echo, a decision device 705, for example, identifies whether it is possible to determine the position of the boundary surface by measuring a bottom echo, or with the aid of some other indirect measurement. For this decision, a check is made as to whether it is possible to determine the position of the boundary surface by measuring bottom echoes or by measuring multiple echoes of higher than first order, or measuring multiple echoes of higher than zero order.

Therefore, a check is made in step 807 as to whether the bottom echo 208 caused by the container bottom 108 is visible in the current echo curve 204. For this purpose, yet a further echo evaluation device 704" may be queried. If the visibility of the direct bottom echo is affirmed, the position $D_B$ thereof is determined and essentially exactly ascertained in step 808. For exact ascertainment of an echo, essentially a position determination method may be used which may also be used for measuring the direct echo, since for exact measurement the position of a peak or echo in an echo curve is to be determined, without having to take the type of echo into consideration. Using the relationship $$d_L = \frac{d_B \cdot \sqrt{\varepsilon_M \cdot \mu_M} - D_B}{\sqrt{\varepsilon_M \cdot \mu_M} - \sqrt{\varepsilon_L \cdot \mu_L}}, \qquad (6)$$

in step 809 essentially the exact distance $d_L$ from the filling material surface 105 may be indirectly ascertained based on the electrical distance $D_B$. The method may be terminated in step 817 without determining the multiple echoes.

On the other hand, if the echo from the container bottom 108 not visible, for example due to excessive damping of the signal within the medium 106, in step 807 the query concerning the visibility of the bottom echo is answered in the negative, and in step 810 a check is made as to whether at least one multiple echo 206 from the media surface 105 or from the filling material surface 105 is detectable or visible in the current echo curve 204. In particular, a check is made as to whether a multiple echo whose order is greater than 0 can be identified. For this decision, for example an appropriate quality parameter which indicates the visibility of the multiple echo may be provided by the evaluation device 701 to the decision device 705 of a level meter.

The identification or classification of multiple echoes may be made based on various methods. For example, multiple echoes may be identified based on multiples of the signal transit time. In determining multiple echoes, use may be made of the fact that multiple echoes have a speed of k times the filling material echo, where k is any natural number. A suitable method may be provided for recognizing the multiple echoes based on their amplitude and position in relation to the identified filling material reflection.

In addition, the method may provide for identification of at least two echoes in the echo curve, and determination of the positions and/or the speed values of the at least two echoes. An echo classification of the two echoes may then be performed, taking into account an algebraic sign of a ratio of the ascertained speed values, the echo classification for each of the identified echoes of the echo curve being associated with a feature class selected from a group including the feature classes bottom echo, multiple echo, anticorrelation echo, and filling material echo. A robust recognition of multiple echoes may be carried out in this way.

If the evaluation of the echo curve 204, 210, 427, 514, 612 leads to the result that a multiple echo 207 from the filling material surface 105 is visible within the echo curve 204, 210, 427, 514, 612, and an echo determination using other methods was not possible, a skip is made to step 811, and the position $D_{ML1}$ of this multiple echo is essentially exactly determined according to echo measurement methods. The evaluation apparatus 701 according to the invention may be activated for determining the multiple echoes.

Essentially the exact distance $d_L$ from the filling material surface 105 may be indirectly determined in step 812 as a function of the position $D_{ML1}$ of the multiple echo, according to the following relationship:

$$d_L = \frac{D_{ML1} + \sqrt{\varepsilon_L \cdot \mu_L} \cdot N \cdot d_D}{(1+N) \cdot \sqrt{\varepsilon_L \cdot \mu_L}} \qquad (7)$$

where N indicates the order of the measured multiple echo, and $d_D$ specifies the length of a dome shaft 503, 613 which may be present in the application. $d_L$ represents the characteristic variable for the location of the boundary surface in the container. This characteristic variable is determined by offsetting the electrical distance $D_{ML1}$, $D_{ML2}$ of a multiple echo by a product of the environmental parameters of the material property of an overlying mediums $\varepsilon_L, \mu_L$, the environmental parameters of the container geometry $d_D$, and the order of the multiple echo, and dividing by the product of the environmental parameters of the material property and the order of the multiple echo.

In the present example of FIG. 4, the illustration of a dome shaft is omitted for the sake of simplicity, so that the length $d_D$ of the dome shaft may be set to 0 m. The dome shaft length may be determined automatically or in a self-learning manner, for example using the positions or locations of two multiple echoes.

Self-learning of the dome shaft length based on the position of two multiple echoes is possible by using the position of a multiple echo $E_{ML1}$ 207 of the filling material reflection which is detected and classified as such, and which has an electrical distance of $D_{ML1}$, and using position of a multiple echo $E_{ML2}$ which is detected and classified as such and which has an electrical distance of $D_{ML2}$. For example, the input device 702 may determine the length $d_D$ of a dome shaft 503, 613 by applying the following relationship to the determined variables:

$$d_D = \frac{(N_1+1) \cdot D_{ML2} - (N_2+1) \cdot D_{ML1}}{\sqrt{\varepsilon_L \cdot \mu_L} \cdot (N_1 - N_2)}.$$

In this relationship, $N_1$ defines the order of the multiple echo at distance $D_{ML1}$, and $N_2$ defines the order of the multiple echo at distance $D_{ML2}$. If it is assumed that the filling material echo is a zero-order multiple echo having an electrical distance of $D_L$, the input device 702 is also able to determine the dome shaft length based on the direct filling material reflection in combination with a further higher-order multiple reflection.

Furthermore, it is possible to determine the location of the filling material surface when a dome shaft 503, 613 is present, without knowing the dome shaft length, based on the position $D_{ML1}$ of a first multiple echo and based on the position $D_{ML2}$ ($D_{ML2}$ is the electrical distance of the echo associated with $E_{ML2}$) of a second multiple echo, according to the following equation:

$$d_L = \frac{1}{\sqrt{\varepsilon_L \cdot \mu_L}} \cdot \left( \frac{N_2 \cdot D_{ML1} - N_1 \cdot D_{ML2}}{N_2 - N_1} \right) \qquad (8)$$

where $N_1$ indicates the order of the multiple echo at position $D_{ML1}$, and $N_2$ defines the order of the multiple echo at position $D_{ML2}$. Thus, for determining the characteristic variable for the location of the boundary surface in the container it is sufficient to determine the electrical positions of two multiple echoes. At least one of the two multiple echoes or both multiple echoes has/have an order greater than 0. Lastly, offsetting the order of the one multiple echo by the electrical distance of the other multiple echo and a relative difference of the orders of the multiple echoes, taking the material properties of the overlying medium into account, results in the sought location of the boundary surface to be determined.

However, if the evaluation of the echo curve 204, 210, 427, 514, 612 does not result in a visible multiple echo 207 from the filling material surface 105, the query concerning the visibility of a multiple echo from the boundary surface, and in particular of the filling material, is answered in the negative, and a skip is made to step 813.

In step 813 a check is made as to whether at least one multiple echo 209 from the container bottom 108 is present and visible in the current echo curve 204. For determining whether a multiple echo 209 is visible which is caused by a reflection on a container bottom 108, for example an algebraic sign of a ratio of ascertained speed values of two echoes may be used once again. The order of the multiple bottom echo may be greater than 0.

If a multiple echo from the container bottom 108 is recognized in step 813, and thus the query concerning the visibility of a multiple echo from the container bottom is answered in the affirmative, in step 814 the distance $D_{MB1}$ of the multiple echo 209 from the container bottom is essentially exactly determined using an echo measurement method. Based on the determined distance $D_{MB1}$ of the multiple echo from the container bottom, a conclusion may be indirectly made concerning the distance $d_L$ from the filling material surface 105 according to $$d_L = \frac{D_{MB1} - (1+N) \cdot \sqrt{\varepsilon_M \cdot \mu_M} \cdot d_B + N \cdot \sqrt{\varepsilon_L \cdot \mu_L} \cdot d_D}{(1+N) \cdot \left( \sqrt{\varepsilon_L \cdot \mu_L} - \sqrt{\varepsilon_M \cdot \mu_M} \right)} \qquad (9)$$

where N is the order of the measured multiple echo of the bottom echo, $d_D$ is the length of a dome shaft 503, 613 possibly present in the system or application, and $d_B$ is the physical height of the container 109 or the distance of the reference plane 603 of the level meter 401 from the container bottom 614. The characteristic variable $d_L$ or the parameter $d_L$ for the location of a boundary surface in a container thus results from offsetting the electrical distance $D_{MB1}$ of a determined multiple echo, which is at least of first order, measured from the echo curve, by the product of the material properties $\varepsilon_M, \mu_M$ of the medium, the geometry $d_B$ of the container as environmental parameter, and the product of material properties $\varepsilon_L, \mu_L$ of the medium between the filling material and the level meter 401 and the geometry of a cover region of a container, in particular the dome shaft length $d_D$. The order N of the recognized multiple echo is taken into account in the two products.

As previously stated, in the present example in FIG. 4 the illustration of a dome shaft 503 or a hall ceiling 602 is omitted for the sake of simplicity, and the length $d_D$ of the dome shaft may thus be set to 0 m. In addition to manually inputting the environmental parameter dome shaft length $d_D$, the dome shaft length may be automatically determined.

Furthermore, it is possible to determine the location $d_L$ of the filling material surface, regardless of whether a shaft 503, 613 is optionally present, without knowing the dome shaft length, based on the position $D_{ML1}$ of a first multiple echo of the bottom reflection and based on the position $D_{MB2}$ (not shown in FIG. 4) of a second multiple echo of the bottom reflection, according to the following equation:

$$d_L = \frac{1}{\sqrt{\varepsilon_L \cdot \mu_L} - \sqrt{\varepsilon_M \cdot \mu_M}} \cdot \left( \frac{N_2 \cdot D_{MB1} - N_1 \cdot D_{MB2}}{N_2 - N_1} - d_B \right) \quad (10)$$

where $N_1$ indicates the order of a first multiple echo at position $D_{MB1}$, and $N_2$ defines the order of a second multiple echo at position $D_{MB2}$. $N_1$ and $N_2$ are different. In one example, at least one of the orders is greater than 0. The characteristic variable is determined by offsetting the electrical distance values of a multiple echo by the order of the other multiple echo, and dividing by the difference of the different orders. The determined value is offset by the container height $d_B$ and the environmental parameters of the material $\varepsilon_M, \mu_M$ and of the overlying atmosphere $\varepsilon_L, \mu_L$.

However, if the evaluation of the echo curve 204, 210, 427, 514, 612 in step 813 does not result in a visible multiple echo 209 from the container bottom 108, a skip is made to step 816. Thus, if the query concerning the visibility of a bottom echo is answered in the negative in step 813, in step 816 the evaluation device 111, 701 identifies an echo loss, which may be signaled to the outside, for example by outputting an interference current through the output device 112, 113.

The cycle of a measurement terminates at end state 817.

The proposed method may provide the option of indirectly determining the position of the filling material surface by ascertaining beforehand at least one multiple echo having an order greater than 0 in order to draw conclusions concerning the position of the filling material surface 105 or the boundary surface of interest, based on the essentially exact position or the essentially exactly measured position of the multiple echo according to the relationships in formulas (7), (8), (9), and (10). The method may be suited in particular for accurately measuring very full containers, as illustrated in FIG. 3. However, the method may also deliver good measured values when the filling level echo 206 is in the region of influence of a reflection from an interference source permanently installed in the container, which is noticeable as a spurious echo in the echo curve. Since only imprecise measurement can take place due to the overlapping of the two echoes, measurement of a multiple echo may be used instead in such situations. For the situation which is to be measured at that time, the decision device 705 may specify the appropriate evaluation apparatus and/or the method used by the evaluation apparatus. In particular, the flexible choice of the measuring principle as the result of selecting the evaluation apparatus may allow use of a measuring principle which is adapted to the particular echo situation. Robust measurement of a filling level is made possible in combination with a display device for the quality.

The method may also be satisfactorily used for measuring media having low dielectric constant values (DK-values) or relative permittivities or permittivity values. Methods based solely on the measurement of the direct filling level echo and/or bottom echo 208 and not on the measurement of the multiple echo may result in high inaccuracy when the filling level of the container 108 is very low, since the filling level echo 206 and the bottom echo 208 mutually overlap one another specifically under these conditions. In such a case, measuring a multiple echo 209 of the bottom reflection may increase the measuring accuracy. The decision unit 705 may be used to select the appropriate measuring method for the measuring situation at hand, for example in that the decision unit loads an appropriate program code in the evaluation apparatus 701, or selects among different evaluation apparatuses 701, and thus among echo evaluation devices 704, 704', 704". Based on the visibility of certain echo types, the decision device 705 is able to determine the appropriate method in each case, and to select the appropriate evaluation apparatus or to control an evaluation apparatus in such a way that it carries out the appropriate method.

It is also mentioned that the principles described in the present text for the level measurement or limit level measurement according to the FMCW principle are just as suitable as level measurement according to the principle of guided microwaves, pulse transit time measurement, the ultrasound principle, the laser principle, or some other transit time method.

The considerations under discussion may be transferred to applications in which the separating layer between two different media in a container is to be determined. Thus, in particular the location of a separating layer, which forms the upper boundary surface of a medium present in the bottom of the container, may be indirectly determined by ascertaining the position of a multiple echo from this separating layer, and on this basis computing the position of the separating layer in a container.

The environmental parameters such as the container height, permittivity values $\varepsilon_M, \varepsilon_L$, or permeability values $\mu_M, \mu_L$ of the individual media as well as of the overlying atmosphere may be manually preset during start-up, or during factory calibration of the sensor 425. However, part or all of the required environmental parameters may also be automatically determined by the level meter, in particular by a parameter determination device.

The dome shaft length and the container height may be manually specified or automatically determined. In particular for automatic determination, within the signal processing of the sensor the container height and/or the dome shaft length may differ slightly from the physically measurable variables due to measuring tolerances. For example, the zero point of the sensor 425 may be altered by setting parameters or by parameterization, for example by introducing an offset, in order to change to a customer-specific reference plane. In addition, for example in one application the height of a container may be defined to include a dome shaft mounted thereon, whereas in other applications, such as the case of a negative dome shaft length, this definition might not be used. Therefore, within the scope of the present text, numerical values are defined for the variables in question and which have a relationship with the physical variables, and on the basis of which special methods, in particular indirect measurement of the filling material location, may be implemented. In other words, by use of the numerical values, variables are intended with whose assistance the use of equations (7), (8), (9), (10) leads to correct results in the given application.

Figure 9:
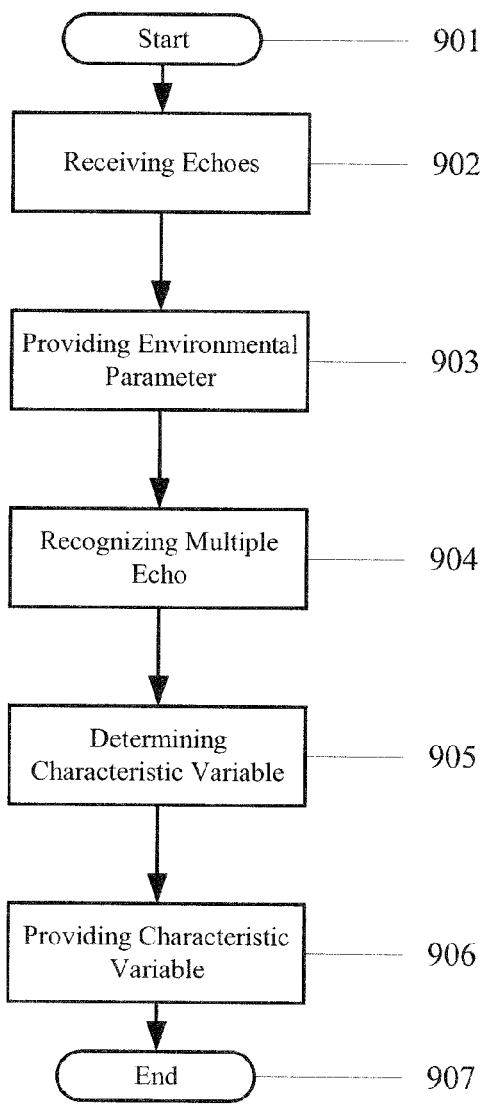
FIG. 9 shows a flow chart for a method for determining a characteristic variable for the location of a boundary surface in a container according to one exemplary embodiment of the present invention.

FIG. 9 shows method steps which are performed when a method for determining the characteristic variable for the location of an boundary surface is carried out, for example in an evaluation apparatus 701. The method begins, starting from the idle state 901, with the reception of an echo curve.

The echo curve together with the peaks which represent the echoes are received in step 902, and environmental parameters are provided in step 903. The environmental parameters may have already been input upon start-up of the evaluation device.

After receipt of the echo curve, a multiple echo is recognized in step 904, it being ensured that only multiple echoes having an order greater than 0 are taken into account. Using a method which takes the order of the multiple echo and the environmental parameters into consideration, for example using a computation method according to equation (7), (8), (9), or (10), the sought characteristic variable is determined in step 905 and provided in step 906 before the method terminates in step 907. The evaluation apparatus 701 may receive a signal for determining the particular evaluation method to be used for measuring the echo curve.

Recognized multiple echoes are thus used for separating layer measurement, level measurement, or limit level measurement.

In addition, it is pointed out that the words "comprising" and "having" do not exclude other elements or steps, and "a" or "an" do not exclude a plurality. It is further pointed out that features or steps which have been described with reference to one of the above exemplary embodiments may also be used in combination with other features or steps of other exemplary embodiments described above. Reference numerals in the claims are not to be construed as limiting.

The invention claimed is:

1. An evaluation apparatus for a level meter for determining a characteristic variable for a location of a boundary surface in a container, comprising:
   an echo curve evaluation device receiving and evaluating an echo curve generated by an electromagnetic wave; and
   an output device providing the characteristic variable for the location of the boundary surface, the output device being connected to the echo curve evaluation device;
   wherein the echo curve evaluation device is configured to recognize a multiple echo in the echo curve, to determine an electrical distance of the multiple echo, and to determine an order of the multiple echo;
   wherein the multiple echo has at least the order of one;
   wherein the order of the multiple echo corresponds to the number of reflections on the boundary surface reduced by the value 1; and
   wherein the echo curve evaluation device is configured to determine the characteristic variable for the location of the boundary surface in the container as a function comprising the order of the multiple echo, an electrical distance of the multiple echo and the relative permittivity of an overlaying atmosphere, and to provide the characteristic variable via the output device.

2. The evaluation apparatus according to claim 1, wherein the echo curve evaluation device is configured to determine a further multiple echo, its electrical distance and its order based on the echo curve; and
   wherein the echo curve evaluation device is configured to determine the characteristic variable for the location of the boundary surface in the container by linking the electrical distance of the further multiple echo and the order of the further multiple echo with the electrical distance of the multiple echo and the order of the multiple echo, and to provide the characteristic variable via the output device.

3. The evaluation apparatus according to claim 1, wherein at least one bottom surface is involved in the creation of the at least one multiple echo.

4. An evaluation apparatus according to claim 1, wherein the echo curve evaluation device takes at least one additional environmental parameter into account;
   wherein the additional environmental parameter is at least one environmental parameter selected from the group of environmental parameters composed of [i] a dome shaft length, and [ii] a negative dome shaft length.

5. The evaluation apparatus according to claim 1, further comprising:
   a parameter determination device determining at least one environmental parameter.

6. The evaluation apparatus according to claim 1, further comprising:
   a tracking device tracking an echo over multiple measuring cycles.

7. The evaluation apparatus according to claim 1, wherein the output unit further includes at least one interface for providing a signal;
   wherein the signal is configured to display an echo loss and/or the type of the recognized multiple echo.

8. A level meter for detecting an echo curve, comprising:
   an evaluation apparatus including (a) an echo curve evaluation device receiving and evaluating an echo curve generated by an electromagnetic wave and (b) an output device providing the characteristic variable for the location of the boundary surface, the output device being connected to the echo curve evaluation device, wherein the echo curve evaluation device is configured to recognize a multiple echo in the echo curve, to determine an electrical distance of the multiple echo, and to determine an order of the multiple echo;
   wherein the multiple echo has at least the order of one;
   wherein the order of the multiple echo corresponds to the number of reflections on the boundary surface reduced by the value 1; and
   wherein the echo curve evaluation device is configured to determine the characteristic variable for the location of the boundary surface in the container as a function comprising the order of the multiple echo, the electrical distance of the multiple echo and the relative permittivity of an overlaying atmosphere, and to provide the characteristic variable via the output device,
   wherein the level meter is configured to transmit the detected echo curve to the evaluation apparatus to obtain the characteristic variable for the location of the boundary surface; and
   wherein the level meter is further configured to determine a filling level based on the characteristic variable for the location of the boundary surface which is obtained from the evaluation apparatus.

9. A level meter according to claim 8, further comprising:
   at least one additional evaluation apparatus determining a further characteristic variable for the location of the boundary surface of the filling level;
   a decision device;
   wherein the evaluation apparatus and each of the at least one additional evaluation apparatus uses a different principle to determine the characteristic variable for the location of the boundary surface;
   wherein the decision device is connected to the evaluation apparatus and to each of the at least one additional evaluation apparatus;
   wherein the decision device is configured to obtain from the evaluation apparatuses the determined characteristic variables for the location of the boundary surface; and
   wherein the decision device is configured to select at least one of the evaluation apparatuses, and to determine the filling level based on the characteristic variable provided by the selected evaluation apparatus.

10. A level meter according to claim 9, wherein the decision device is configured to indicate the quality for determining the filling level.

11. A method for determining a characteristic variable for a location of a boundary surface in a container, comprising:
    receiving an echo curve generated by an electromagnetic wave;
    recognizing a multiple echo in the echo curve,
    determining an electrical distance of the multiple echo;

determining an order of the multiple echo, the multiple echo having at least the order of one;

determining a characteristic variable for the location of the boundary surface in the container as a function comprising the order of the multiple echo, the electrical distance of the multiple echo; and providing the characteristic variable for the location of the boundary surface.

12. A method for level measurement, comprising:

detecting an echo curve by carrying out a transit time measurement;

determining a characteristic variable for the location of a boundary surface in a container by evaluating the detected echo curve, using the following method for determining a characteristic variable for the location of a boundary surface:

receiving an echo curve generated by an electromagnetic wave;

recognizing a multiple echo in the echo curve, determining an electrical distance of the multiple echo; and determining an order of the multiple echo, the multiple echo having at least the order of one;

wherein the order of the multiple echo corresponds to the number or reflections on the boundary surface reduced by the value 1;

determining the characteristic variable for the location of the boundary surface in the container as a function comprising the order of the multiple echo, the electrical distance of the multiple echo, and the relative permittivity of an overlaying atmosphere; and providing the characteristic variable for the location of the boundary surface: and ascertaining a filling level based on the characteristic variable for the location of a boundary surface.

13. The method for level measurement according to claim 12, further comprising:

providing at least one further method for determining a characteristic variable for the location of a boundary surface in a container;

wherein the method for determining a characteristic variable for a location of a boundary surface in a container and the at least one further method for determining a characteristic variable for the location of a boundary surface in a container use different principles for determining the characteristic variable for the location of the boundary surface;

selecting a method; and ascertaining the filling level based on the characteristic variable for the location of the boundary surface, using the selected method.

14. A computer-readable memory medium on which a program is stored which carries out the following method when executed on a processor:

receiving an echo curve generated by an electromagnetic wave;

recognizing a multiple echo in the echo curve, determining an electrical distance of the multiple echo; and determining an order of the multiple echo, the multiple echo having at least the order of one;

wherein the order of the multiple echo corresponds to the number of reflections on the boundary surface reduced by the value 1;

determining a characteristic variable for the location of the boundary surface in the container as a function comprising the order of the multiple echo, the electrical distance of the multiple echo, and the relative permittivity of an overlaying atmosphere; and providing the characteristic variable for the location of the boundary surface.

15. A program element which carries out the following method executed on a processor:

receiving an echo curve generated by an electromagnetic wave;

recognizing a multiple echo in the echo curve, determining an electrical distance of the multiple echo; and determining an order of the multiple echo, the multiple echo having at least the order of one;

wherein the order of the multiple corresponds to the number of reflection on the boundary surface reduced by the value 1;

determining a characteristic variable for the location of the boundary surface in the container as a function comprising the order of the multiple echo, the electrical distance of the multiple echo, and the relative permittivity of an overlaying atmosphere; and providing the characteristic variable for the location of the boundary surface.

\* \* \* \* \*